United States Patent [19]

Alaily

[11] 3,845,240

[45] Oct. 29, 1974

[54] SYNC PULSE DETECTOR FOR VIDEO TELEPHONE SYSTEM

[75] Inventor: Jamil K. Alaily, La Grange, Ill.

[73] Assignee: GTE Automatic Electric Laboratories Incorporated, Northlake, Ill.

[22] Filed: Oct. 16, 1972

[21] Appl. No.: 298,154

[52] U.S. Cl........ 178/7.3 S, 178/69.5 TV, 179/2 TV

[51] Int. Cl. ............................................ H04n 5/08

[58] Field of Search......... 178/7.3 S, 7.3 DC, 7.3 R, 178/7.5 R, 7.5 S, 69.5 TV; 328/111; 179/2 TV

[56] References Cited

UNITED STATES PATENTS

| | | | |
|---|---|---|---|
| 3,290,441 | 12/1966 | Humphrey | 178/7.5 S |
| 3,328,602 | 6/1967 | Taylor | 328/111 |
| 3,527,887 | 9/1970 | Clapp et al. | 178/7.5 S |
| 3,662,096 | 5/1972 | Morton | 178/7.3 S |

*Primary Examiner*—Benedict V. Safourek
*Assistant Examiner*—Jin F. Ng
*Attorney, Agent, or Firm*—Robert J. Black

[57] ABSTRACT

A video sync pulse detector for use in video telephone systems. Detection of sync pulses of proper frequency and duration is used to operate switching equipment to connect video telephone subscribers to a service operator. Sync pulse, separation, frequency and duration detection are all combined in the circuitry to accurately determine video signals.

11 Claims, 1 Drawing Figure

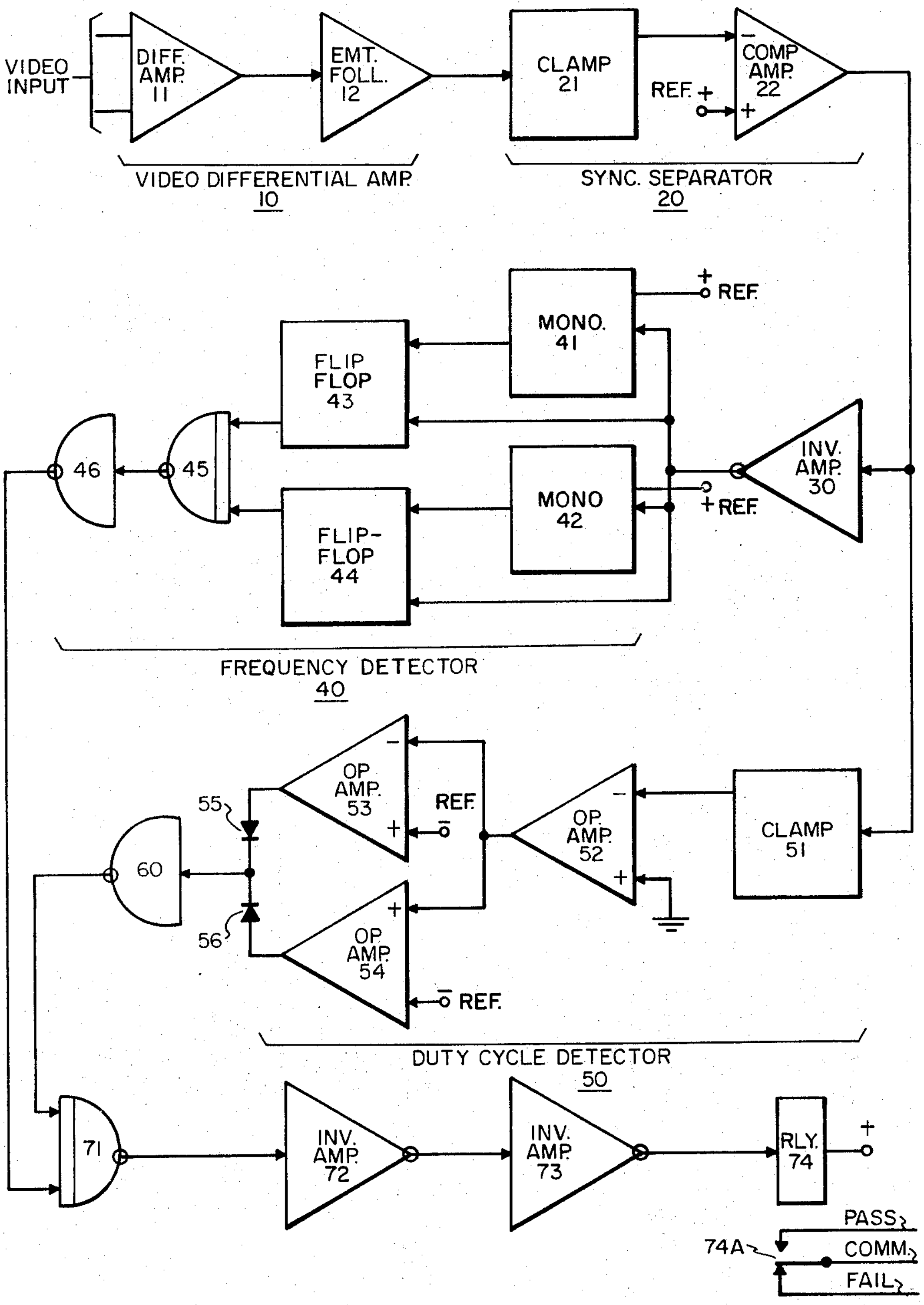
VIDEO INPUT
DIFF. AMP. 11
EMT. FOLL. 12
CLAMP 21
REF. +
COMP. AMP. 22
VIDEO DIFFERENTIAL AMP. 10
SYNC. SEPARATOR 20
MONO. 41
+ REF.
FLIP FLOP 43
46
45
INV. AMP. 30
MONO 42
+ REF.
FLIP-FLOP 44
FREQUENCY DETECTOR 40
OP. AMP. 53
REF.
OP. AMP. 52
CLAMP 51
55
60
56
OP. AMP. 54
REF.
DUTY CYCLE DETECTOR 50
71
INV. AMP. 72
INV. AMP. 73
RLY. 74
+
PASS
74A
COMM.
FAIL

SYNC PULSE DETECTOR FOR VIDEO TELEPHONE SYSTEM

BACKGROUND OF THE INVENTION

1. Field of the Invention

This invention pertains to communication systems and more particular to telephone communication systems that provide both audio and visual communication facilities.

2. Description of the Prior Art

One of the most recent forms of telephone communication systems provides in addition to an audio communication path conventionally found in telephone systems provision for apparatus to receive and transmit television signals via video communication path to enable the called and calling stations to see as well as to hear each other. The called station may be within the same central office as the calling station or may in fact be served by a central office thousands of miles away. In any event special equipment is required in the originating office, intermediate offices and the receiving office to establish audio and video connections forward to the called station. The called station is signaled in a conventional manner to indicate that a calling connection has been directed thereto and if the called station is equipped with apparatus identical to that of the calling station, the resultant audio and video communication may thereupon ensue.

In the anticipated combination of audio and visual telephone service, it is expected that operator services similar to those provided in conventional telephone circuits will also be included. The operator handling such service or providing assistance thereto, must control the video as well as the audio part of the connection. Special trunks are employed to route calls to the operator providing such assistance. However, audio only facilities normally link the switching equipment to the operator's position.

The video portion of the call is not extended from the switching center to the switchboard although the operator may control the video signal by means of equipment included at her position. It is anticipated that in lieu of the customer seeing the assistance operator during the contact a fixed video image would be transmitted to the customer from the switching equipment. Other service and assistance codes normally applicable to telephone service such as directory assistance, repair service, etc. will probably not have specific service counterparts in the video telephone service. Calls to obtain these services will follow regular telephone procedures in order to permit calls about video telephone service to be placed from non-video telephone stations.

Obviously it is necessary that an operator providing assistance to audio-visual equipped telephone lines be aware that she is indeed answering a video telephone circuit when signaled. Therefore special equipment is required to identify to the operator incoming calls actually from a video telephone customer requiring assistance. If that identification is correct then the call can be routed to the special operator's switchboard which is equipped as noted above with audio only facilities.

To accurately identify the incoming signals detection of the video synchronizing pulses seems to provide a valid method of identification.

Detection of synchronizing pulses from a received composite television signal while affecting cancellation of noise signals superimposed thereon is known. Such a technique is disclosed in U.S. Pat. No. 3,290,441 issued to John G. Humphrey on Dec. 6, 1966. Here the separate synchronizing pulses from a composite television signal are removed and an output signal is produced when the amplitude of the synchronizing signal lies in a predetermined range. The output is utilized to produce an automatic gain potential for use in a television receiver. However, no use of such a circuit with the detection technique disclosed herein is known.

SUMMARY OF THE INVENTION

The present detector of video synchronizing pulses or video sync detector consists of a sync-separator, frequency detector and duty cycle detector. The circuitry is used to identify to a telephone operator, a video telephone customer requesting assistance.

A call is routed using video telephone trunk circuits and links to the operator switchboard which is equipped with audio only facilities. The video sync detector circuit checks for proper amplitude, frequency and duty cycle of the horizontal sync pulses within one field and then signals associated switching circuits a pass or fail condition before the call is routed to the operator switchboard. If a pass signal is generated, the call is then extended to the operator's switchboard.

In the present invention an amplitude test is also performed in the sync separator circuit. This circuit will accept only signals with an amplitude greater than or equal to a predetermined level. This test is necessary in order to avoid weak synchronizing pulses which may have the proper frequency and duty cycle but result from coupling to an adjacent video transmission path. This would give the operator a false signal to answer a call that was not placed on the appropriate trunk.

Both frequency and duty cycle tests are necessary in order to avoid false signaling to the operator during transmission tests. These tests which require a sinesoidal signal swept over a wide range of amplitude and frequency are normally applied to the video path. The presence of the sweep signals might be falsely interpreted as synchronizing pulses.

Therefore, with the three tests provided by the present video sync detector (amplitude, frequency and duty cycle tests) it is guaranteed that a "pass" signal will be generated only when a composite video waveform applied to the video sync detector contains the proper horizontal sync pulses.

BRIEF DESCRIPTION OF THE DRAWING

The single sheet of drawings appended to the present specification is a combined logic and block diagram of a video sync pulse detector in accordance with the present invention.

It should be noted that conventional logic symbols have been employed for the most part in this drawing. The detailed circuitry contained therein does not necessarily form a part of the present invention, however, in the following detailed description a discussion of the circuitry of a practical embodiment of the present invention will be presented.

DETAILED DESCRIPTION

Referring now to the single sheet of drawings appended hereto, a composite video signal received from a video telephone subscriber and destined for connection to a video telephone service operator, is connected to the input of the present video sync detector through a video differential amplifier 10 by means of a balanced transmission pair. This incoming signal contains synchronizing pulses that are transmitted during the blanking period, being superimposed on the horizontal blanking pulses.

The synchronizing pulses which are free of picture information as well as the composite audio waveform are like those to be expected in conventional television transmission systems.

As noted above the composite video signal input is connected to video differential amplifier 10. Amplifier 10 consists of a differential amplifier 11 whose input is connected to the incoming video source with its single ended output connected to an emitter follower 12. The circuitry of both amplifier 11 and emitter follower 12 are conventional in nature. In a practical embodiment of the present invention the amplifier provides a voltage gain of 5 and a balanced input with a 100 ohm input impedance and a single ended output. The amplifier 11 includes a differential pair of transistors which amplify the different signals applied at their bases, a separate constant current source is provided for amplifier 11; the emitter follower 12 is of conventional design.

The input signal applied to a video differential amplifier 10 is a composite video waveform. In one practical embodiment of the present invention having a 0.2 volt peak-to-peak synchronizing tip, 0.002 microfarad capacitors are connected across the bases of the two transistors included in the video differential amplifier to bypass the pre-emphasis and de-emphasis pulse of the incoming composite video waveform.

The output of the video differential amplifier 10 is connected to a sync separator 20. This circuit consists of a clamp 21, utilizing a single transistor in a conventional configuration whose output is taken from the emitter and conducted to the comparator amplifier 22. Comparator amplifier 22 is a conventional integrated circuit operational amplifier. In the present embodiment a Fairchild μA710 is utilized.

In its static state the transistor included in clamp 21 is in saturation. A 1 volt peak-to-peak negative sync tip signal is applied to the base of the transistor and is clamped at ground level at the emitter. The clamped signal is then applied to the inverting or negative input of comparator amplifier 22. The non-inverting input is DC biased from an adjustable reference to approximately one-half the amplitude of the sync pulses, so that even if the amplitude of the input sync pulses is decreased from its normal value to a few millivolts above the DC bias this will be enough to trigger comparator amplifier 22. The comparator amplifier output is considered either a logic "1" (high level) or "0" (low level). A logic "1" is produced when the voltage at the inverting input is less positive than that of the non-inverting input and a logic "0" is when the voltage at the inverting input is more positive than that of the non-inverting input. Therefore only positive sync pulses are derived from a composite video waveform. The output of the comparator amplifier 22 provides a fixed amplitude signal of approximately 3.2 volts peak-to-peak.

Output from the sync separator 20 is taken from the comparator amplifier 22 and conducted to the inputs of frequency detector 40 through an inverter amplifier 30 of conventional design, and to the input of duty cycle detector 50. The frequency detector 40 contains two retriggerable monostable multivibrators 41 and 42. In a practical embodiment of the present invention both multivibrators were of the integrated circuit type and employed units manufactured by Motorola and designated MC8601P.

Also contained in the frequency detector are two bistable multivibrators (flip-flop circuits) designated 43 and 44. In a practical embodiment of the present invention these circuits were implemented with a Texas Instrument SN7474N integrated circuit. Two gates 45 and 46 complete the circuit complement of the frequency detector. Gate 45 functions as a NAND gate while 46 provides only an inverting function. Both gates in the practical embodiment of the present invention were implemented with a Motorola MC7400P integrated circuit.

All the circuits included in frequency detector 40 are wired for positive edge triggering. Inverter amplifier 30 connecting the signal from sync separator 20 to frequency detector 40 increases the magnitude of the signal from sync separator 20 to 5 volts peak-to-peak while inverting the signal. Upper and lower frequency limits are established by presetting the timing interval of monostable multivibrators 42 and 41 respectively. Flip-flops 43 and 44 are triggered simultaneously with monostables 41 and 42 but the output is determined by the state of the upper input at the time of trigger threshold. If the period of the input signal from inverter amplifier 30 conducted to monostable 41, 42 and flip-flop 43 and 44 is shorter than the preset timings of monostable 42, then a constant high level will be present at the upper inputs of flip-flop 44 and 43 forcing the complementary output of flip-flop 44 to go low and the output of flip-flop 43 to go high both outputs will remain in this state until the period of the input signal becomes shorter than that of monostable 42. If the period of the input signal from inverter amplifier 30 conducted to monostable 41, 42 and flip-flop 43 and 44 is longer than the preset timing of monostable 41, then a low level will be present at the upper inputs of flip-flop 43 and 44 before the next input pulse. This low level forces the output of flip-flop 43 to go low and the complementary output of flip-flop 44 to go high. Both flip-flop outputs will remain in this state until the period of the input signal becomes longer than that of monostable 41.

If the period of the input signal from inverter amplifier 30 conducted to monostables 41, 41 and flip-flops 43, 44 is within the preset timing interval of monostable 41 and 42, then a constant high level will present at the upper input of flip-flop 43, forcing its output to go high and remain high. A low level will be present at the upper input of flip-flop 44 before the next input pulse. This low level forces the complementary output of flip-flop 44 to go high and remain high unitl the period of the input signal becomes shorter than that of monostable 42. Therefore both inputs to NAND gate 45 are high only when the period of the input signal is longer than the preset period of monostable 42, and shorter than the preset period of monostable 41. Under this condition the output of NAND gate 45 is low. This output is inverted by NAND gate 46.

As noted above the output of the sync separator 20 is also connected to the duty cycle detector 50. This constant amplitude signal is clamped to ground by virtue of clamp circuit 51. In a practical embodiment of the present invention clamp circuit 51 consists of a single transistor the output of which is taken from its emitter and applied to the integrator circuitry of the duty cycle detector 50. The integrator formed by operational amplifier 52 produces at its output a DC level of negative polarity with respect to ground, proportional to the duty cycle of the input signal. This negative DC level is fed simultaneously to the inverting input of the operational amplifier 53 and to the non-inverting input of operational amplifier 54. Operational amplifier 52 is a Fairchild μA741 while operational amplifiers 53 and 54 were implemented with a Signetics N5558V integrated circuit. Operational amplifiers 53 and 54 in combination form a comparator circuit.

The non-inverting input of operational amplifier 53 is DC biased with a negative voltage developed from a first reference source while the inverting input of operational amplifier 54 is also DC biased with a negative voltage from a second reference source. The reference potentials applied to operational amplifiers 53 and 54 are preset to correspond to approximately the same DC potentials developed at the output of integrator 52 by the minimum and maximum duty cycle limits. The reference at the non-inverting input of operational amplifier 53 is set to approximately the same DC level as the upper limit duty cycle signal and the reference level set at the input of operational amplifier 54 is set to approximately the same DC potential as the lower limit duty cycle signal.

A duty cycle signal within the proscribed limits produces at the input to operational amplifier 53 (the low limit duty cycle detector) a signal less negative than that of the reference potential connected to operational amplifier 53 and at the input to operational amplifier 54 (the high limit duty cycle detector) a signal more negative than that of the reference potential connected to operational amplifier 54. Because the input signal to operational amplifier 53 is connected to its inverting input the resultant output signal will be low. Because the negative signal applied to the non-inverting input of operational amplifier 54 is more negative than the reference potential the output of operational amplifier 54 will also be low. If the signal at the output of operational amplifier 52 is lower, the output signal from operational amplifier 53 will be low but the output from amplifier 54 will be high. Conversely if the signal from operational amplifier 52 is higher than the proscribed limit, the output of amplifier 53 will be high and the output of amplifier 54 will be low. The output of amplifiers 53 and 54 are connected to the anodes of diodes 55 and 56 respectively. The output at the cathodes of diodes 55 and 56 is low indicating a valid duty cycle if and only if the input DC level to the comparators is within the preset reference limits. Combinations of high and low signals at the cathodes of diodes 55 and 56 indicate improper duty cycles resulting from the input DC level to the comparators falling outside the preset reference limits. The resulting output voltage taken from the cathodes of diodes 55 and 56 is inverted by inverter 60 which in a practical embodiment of the present invention consists of a single transistor.

A sync pulse at the output of comparator 22, with the correct duty cycle and frequency will develop a high level signal at the output of NAND gate 46 and inverter 60. With these two inputs connected to the two inputs of NAND gate 71, this will result in a logic "0" or low level signal at the output of NAND gate 71. Under any other conditions the output of NAND gate 71 is high. The low level signal at the output of NAND gate 71 is conducted to the input of inverter 72 resulting in a high level at its output. This high level is then conducted to the input of inverter 73 causing relay 74 to operate to indicate a pass condition. If a high level appears at the output of NAND gate 71 its level is inverted by inverter 72 and a low level is present at the input of inverter 73 which will not operate relay 74, thus indicating a fail condition. At contact **74*a* a common signal will be extended through make contact 74*a*** via the pass lead to associated switching equipment which will then connect the incoming video trunk signal to the assisting operator.

Obviously detection of signals of improper frequency or improper duty cycle, will fail to cause relay 74 to operate and the associated switching equipment will not be operated. It should also be noted that a failure condition will result from power supply failure in the source supplying potential to the video sync pulse detector, or if no input is applied to the video differential amplifier 10.

What is claimed is:

1. A video signal sync pulse detector including: sync pulse separating means connected to a source of composite video signals operated in response to detection of pulses included in said video signals to generate sync pulses of a predetermined polarity and of a fixed amplitude at the same frequency and same width as said detected pulses; frequency detecting means connected to said pulse separating means, operated in response to said sync pulses generated by said separating means being within predetermined frequency limits to generate a first output signal; duty cycle detecting means connected to said pulse separating means, operated in response to said pulses generated by said separating means being within predetermined duration limits to generate a second output signal; first gating means connected to said frequency detecting means and to said duty cycle detecting means, operated in response to both said first and second output signals in combination, to generate a third output signal; an output means connected to said first gating means operated in response to said third output signal to provide an indication of the presence of sync pulses of correct frequency and correct duration in said composite video signals.

2. A video signal sync pulse detector as claimed in claim 1 wherein said sync pulse separating means comprises a clamp circuit connected to said source of composite video signals and connected to said clamp circuit a comparator amplifier further including connection to a source of reference potential.

3. A video signal sync pulse detector as claimed in claim 1 wherein said frequency detecting means comprises: first and second monostable multivibrators each connected to said sync pulse separating means, second gating means; a first bistable multivibrator connected between said first monostable multivibrator and said second gating means and a second bistable multivibrator connected between said second monostable multivibrator and said second gating means.

4. A video signal sync pulse detector as claimed in claim 3 wherein said first and second monostable multivibrators each include a separate connection to an adjustable source of reference potential whereby upper and lower frequency limits of said pulses generated by said separating means are established.

5. A video signal sync pulse detector as claimed in claim 1 wherein said duty cycle detection means includes a first operational amplifier circuit; a clamp circuit connecting said sync separating means to said first operational amplifier; said first operational amplifier operated in response to output pulses from said sync pulse separating means; and comparator means including second and third operational amplifiers each connected to said first operational amplifier and each connected to a separate adjustable source of reference potential, said second and third operational amplifiers operated in response to operation of said first operational amplifier to generate said second output signal.

6. A video signal sync pulse detector as claimed in claim 1 wherein said gating means comprises a NAND gate.

7. A video signal sync pulse detector as claimed in claim 1 wherein said output means comprises a first inverting amplifier connected to said first gating means, a relay, and a second inverting amplifier connected between said first inverting amplifier and said relay.

8. A video signal sync pulse detector as claimed in claim 1 wherein there is further included: a differential amplifier connected between said source of video signals and said sync pulse separating means.

9. A video signal sync pulse detector as claimed in claim 1 wherein there is further included: an inverted amplifier connected between said sync pulse separating means and said frequency detecting means.

10. A video signal sync pulse detector as claimed in claim 1 wherein there is further included signal inverting means connected between said frequency detecting means and said first gating means.

11. A video signal sync pulse detector as claimed in claim 1 wherein there is further included: signal inverting means connected between said duty cycle detecting means and said first gating means.

* * * * *